United States Patent [19]

Heijkenskjold et al.

[11] 4,180,946

[45] Jan. 1, 1980

[54] TOOL HOLDING SPINDLE ASSEMBLY PARTICULARLY FOR A GRINDING MACHINE

[76] Inventors: Mats C. D. Heijkenskjold; Olle (Olof) J. G. Hedberg; Vello Klaassen; Sture V. Larsson, all of Lidkoping, Sweden, S-53101; Helmut Habermann, 2 allee principale; Maurice Brunet, 41 quai Camere, both of 27200 Vernon, France

[21] Appl. No.: 883,213

[22] Filed: Mar. 3, 1978

Related U.S. Application Data

[63] Continuation-in-part of Ser. No. 726,785, Sep. 27, 1976, abandoned.

[30] Foreign Application Priority Data

Oct. 2, 1975 [FR] France .................... 75 30209

[51] Int. Cl.² .......................................... B24B 5/00
[52] U.S. Cl. .................... 51/134.5 R; 308/10
[58] Field of Search ............... 51/134.5 R; 308/10

[56] References Cited

U.S. PATENT DOCUMENTS

| | | | |
|---|---|---|---|
| 3,609,931 | 10/1971 | Voorhies | 51/134.5 R |
| 3,698,775 | 10/1972 | Gilbert | 308/10 |
| 3,787,100 | 1/1974 | Habermann | 308/10 |
| 3,811,740 | 5/1974 | Sacerdoti | 308/10 |
| 3,820,859 | 6/1974 | Brown | 308/10 |
| 3,860,300 | 1/1975 | Lyman | 308/10 |
| 3,877,761 | 4/1975 | Boden | 308/10 |
| 3,890,019 | 6/1975 | Boden | 308/10 |
| 3,909,082 | 9/1975 | Ishikawa | 308/10 |

FOREIGN PATENT DOCUMENTS 2149644  3/1973  France ........................ 308/10

*Primary Examiner*—Harold D. Whitehead
*Attorney, Agent, or Firm*—Bacon & Thomas

[57] ABSTRACT

The tool-holding spindle assembly, particularly for a grinding machine, comprises means for supporting the shaft of the spindle and a power drive, for example an electric motor for rotating the spindle. The support means comprise at least one electromagnetic radial bearing controlled by a radial detector, having an annular armature mounted on the shaft of the spindle and a fixed armature surrounding this annular armature, an electromagnetic axial bearing having a disc-shaped armature mounted on the shaft of the spindle and a fixed armature, a chain for controlling the radial and/or axial position of the spindle, said chain being connected on the one hand to at least one detector of the radial and/or axial position of the spindle, and on the other hand to excitation coils of the armatures of each magnetic bearing, and means for selectively modifying the signal generated by said at least one position detector. This tool-holding spindle assembly makes it possible to give a rotating spindle a high speed of rotation and the desired rigidity for obtaining a very high machining precision. Further, precise displacements of the tool of limited amplitude may be controlled by modifying the detector's output signal.

11 Claims, 5 Drawing Figures

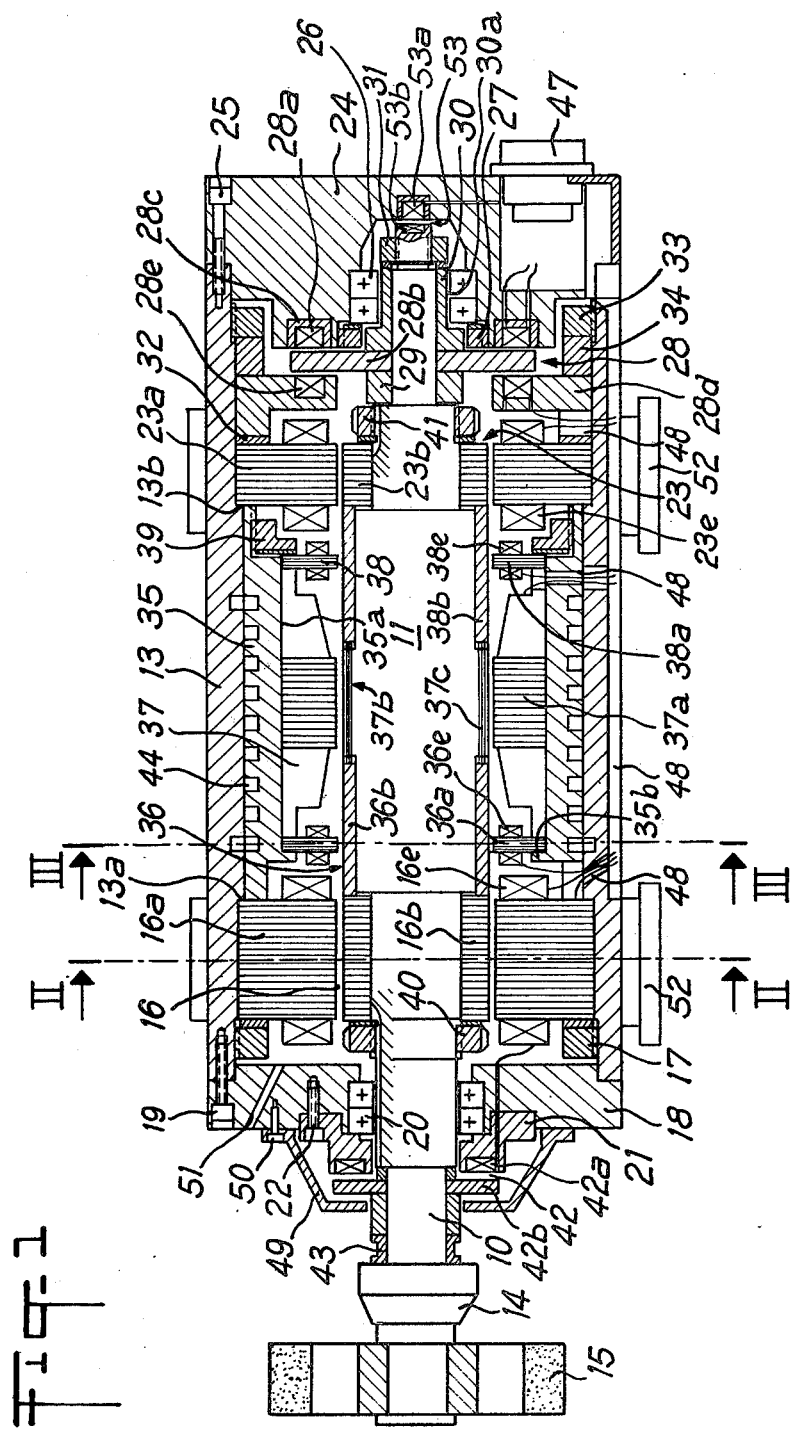

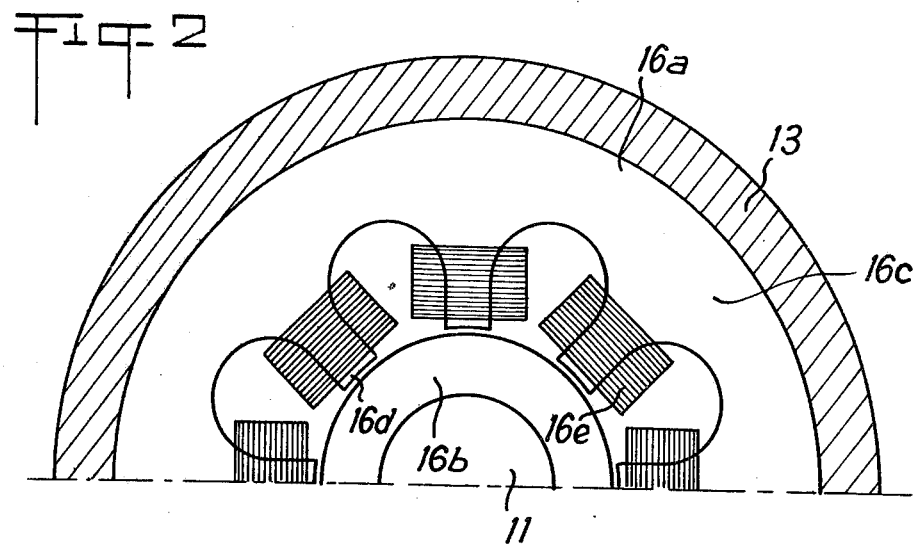
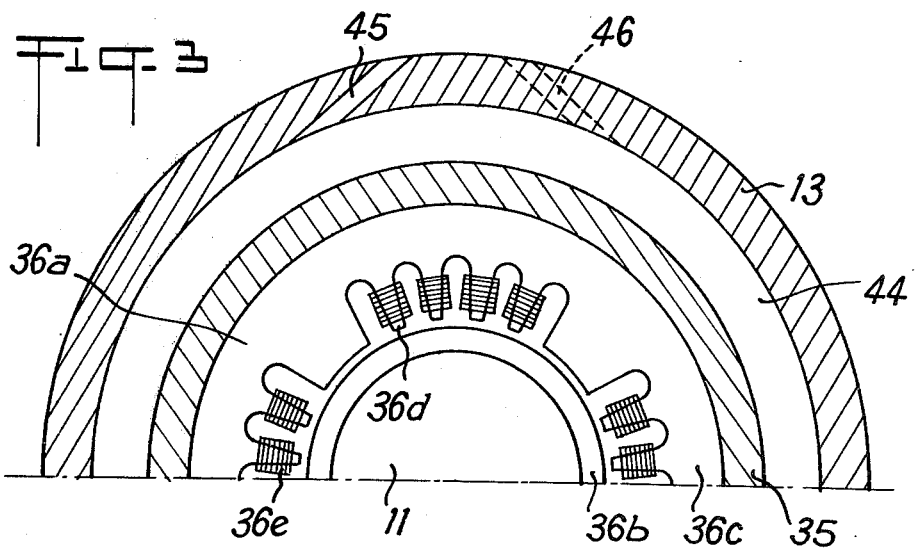

TOOL HOLDING SPINDLE ASSEMBLY PARTICULARLY FOR A GRINDING MACHINE

This application is a continuation-in-part of our application Ser. No. 726,785, filed Sept. 27, 1976, now abandoned.

BACKGROUND OF THE INVENTION

The present invention relates to a tool-holding assembly assembly particularly for a grinding machine.

In a grinding machine, the shaft of the tool-holding spindle is generally mounted in radial bearings by means of rollers. With this mode of assembly, the peripheral speed of the shaft of the spindle is limited by the maximum value admissible for the rollers. Consequently, to drive the spindle at a speed of rotation as high as possible, the diameter of the shaft of the spindle and, therefore, its inertia must be limited. The consequence of this limitation is a reduction in the rigidity of the spindle, particularly at its free end holding the tool. This lack of rigidity is translated by displacements of the axis of rotation or the tool, particularly when this tool is working, and is thus considerably detrimental to the machining precision. As, moreover, the rollers are subject to wear due to the friction, which wear is all the more rapid as the speed of rotation of the spindle is greater, the amplitude of the radial movements of the tool tends to increase in time.

Attempts have been made to obviate these drawbacks by limiting the friction of the shaft of the spindle on its support bearings by using a hydraulic suspension, the shaft of the spindle being supported in a sealed bearing filled with viscous fluid. It is true that this assembly enables the frictions to be reduced and the diameter of the shaft of the spindle to be increased for relatively low speeds of rotation, but does not make it possible to avoid radial displacements of the axis of the spindle and to give the rotating spindle the desired rigidity for attaining a very high machining precision. Furthermore, at high speed of rotation, the frictions become considerable.

It is an object of the present invention to provide a tool-holding support assembly which avoids the above-mentioned drawbacks of the known assemblies.

It is a further object of the present invention to provide a tool-binding support assembly which makes it possible to precisely control displacements of the tool of limited amplitude.

According to the invention, the tool-holding spindle assembly comprises means for supporting the shaft of the spindle and a power drive, for example, an electric motor for rotating the spindle, said supporting means comprising at least one electromagnetic radial bearing controlled by a radial detector, having an annular armature mounted on the shaft of the spindle and a fixed armature, a chain for controlling the radial and/or axial position of the spindle, said chain being connected on the one hand to at least one detector of the radial and/or axial position of the spindle, and on the other hand to excitation coils of the armatures of each magnetic bearing, and means for selectively modifying the signal generated by said at least one position detector.

Thus, appears a first advantage of the assembly according to the invention, which resides in the fact that the shaft of the spindle in rotation is not subject to any friction, this shaft being supported by electromagnetic bearings and being driven by and electric motor whose armature may be directly mounted thereon. Moreover, the electromagnetic suspension not bringing about any limitation of the diameter of the shaft of the spindle, this latter may present a high inertia and considerable rigidity, thus avoiding vibrations at high speeds. Further, the control of each radial bearing by detector, allied to the rigidity of the shaft, enables a high machining precision to be attained, by reducing the radial displacement of the axis of rotation of the spindle. Still further, the selective modification of the signal generated by at least a position detector offers the possibility of precisely controlling the positioning and displacement of the tool during a machining operation, whereby particular functions may be carried out, such as a control of radial and/or axial displacement of the spindle, correction of conicity, etc.

The assembly preferably comprises two electromagnetic radial bearings each controlled by a radial detector and disposed near the end zones of the spindle shaft, the armature of the motor being mounted on the shaft of the spindle substantially at equidistance from the two radial bearings. The spindle shaft thus being centered radially at two places separate from each other, any nutation of precession of its axis of rotation, as well as any vibration, is rapidly attenuated.

The axial bearing is controlled by detector so as to maintain the spindle against any axial displacement.

The radial detectors may be electromagnetic detectors having an annular armature mounted on the shaft of the spindle and a fixed armature.

The invention will be more readily understood on reading the following description given with reference to the accompanying drawings, in which:

FIG. 1 shows a schematic view of a tool-holding spindle assembly for a grinding machine in accordance with the invention, in axial section along line I—I of FIG. 2;

FIG. 2 shows a partial schematic view, in section along line II—II of FIG. 1;

FIG. 3 is a partial schematic view, in section, along line III—III of FIG. 1;

DESCRIPTION OF THE PREFERRED EMBODIMENTS

Figure 4:
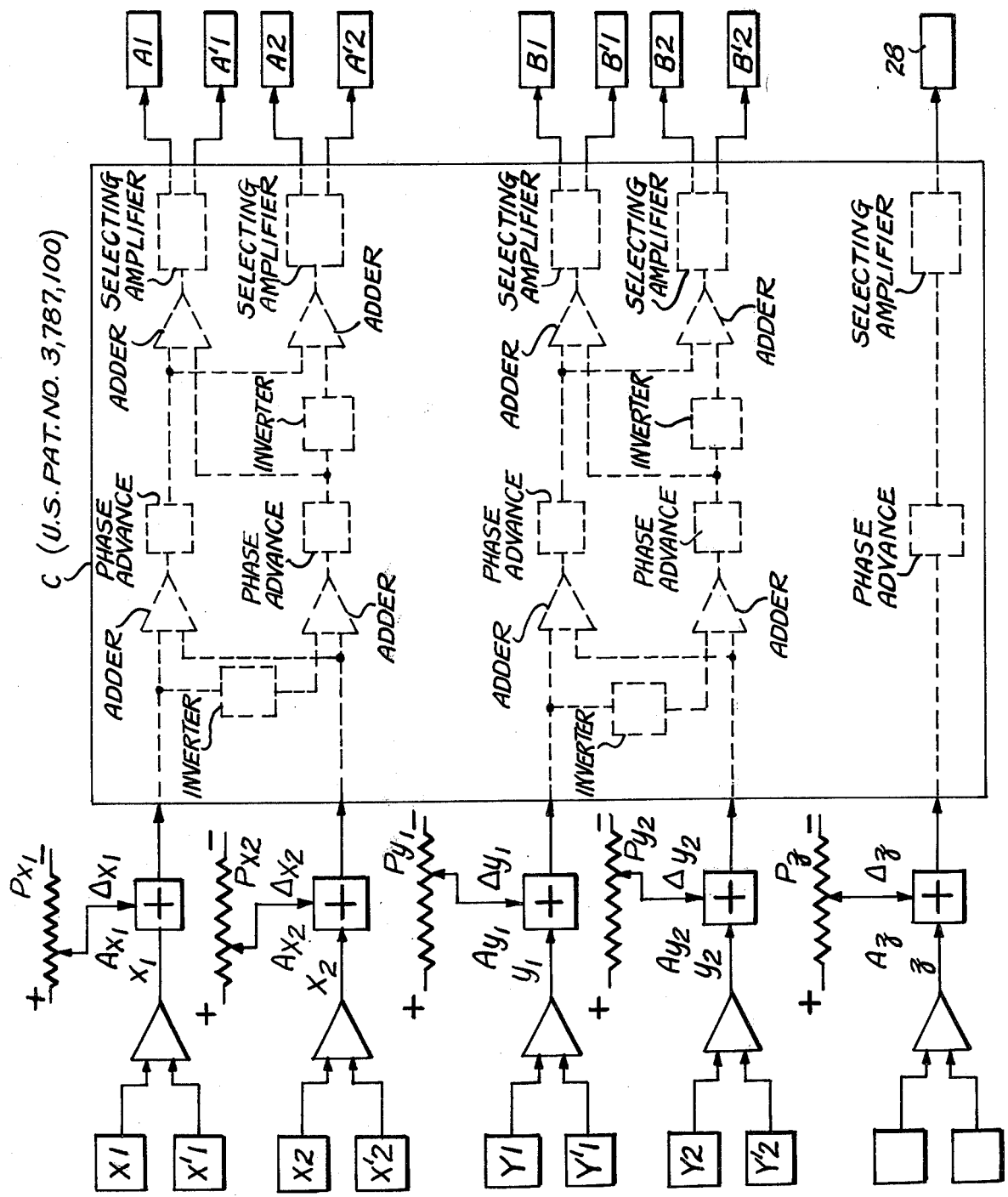
FIG. 4 shows a control device for the electromagnetic suspension means of the assembly shown by FIG. 1.
Figure 5:
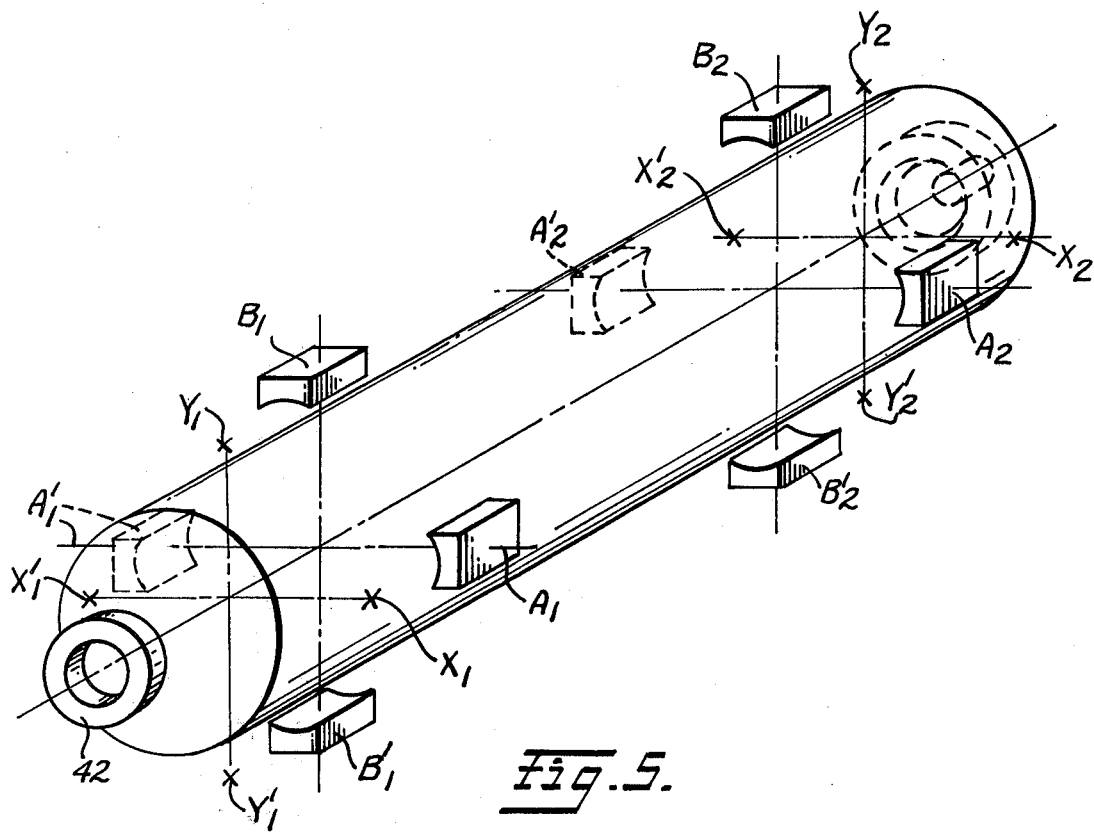
FIG. 5 is a schematic view of the locations of the detector units and of the electromagnets in the assembly shown by FIG. 1.

Referring now to the drawings, FIG. 1 shows a tool-holding spindle 10 for a grinding machine, of which the shaft 11 is housed in a cylindrical envelope 13 and whose end carries a mandrel 14 in which is mounted a grinding wheel 15.

Near its front end, located on the grinding wheel 15 side, the envelope 13 presents an inner abutment shoulder 13a against which the ferromagnetic portion of the annular armature 16a of an electromagnetic radial bearing 16 is applied, by means of a ring 17 screwed on the inner surface of the envelope 13. The armature 16a surrounds the annular armature 16b of the radial bearing 16, said armature being fixed to the shaft 11. As may be seen more particularly in FIG. 2, the armature 16a is composed of a polar piece 16c which comprises an outer annular portion and branches 16d, projecting radially towards the inside and each surrounded by a coil 16e, the direction of winding of the adjacent coils being opposed.

The front of the envelope 13 is closed by an annular cover 18 fixed to the envelope 13 by screws 19. The cover 18 serves as front reserve bearing for shaft 11, by means of rollers 20, a clearance being provided between the inner surface of the rollers 20 and the outer surface of the shaft 11. The rollers 20 are blocked axially against an internal shoulder of the cover 18 by means of an annular ring 21 fixed to the cover 18 by screws 22.

In its rear part, the envelope 13 has an internal abutment shoulder 13b against which is applied the ferromagnetic portion of the annular armature 23a of a second electromagnetic radial bearing 23. The constitution of this radial bearing 23 is similar to that of the radial bearing 16 and comprises an annular armature 23b mounted on the shaft 11. Like the armature 16a of the radial bearing 16, the armature 23a of the radial bearing 23 is provided with coils 23e.

The rear of the envelope 13 is closed by a cover 24 fixed by screws 25 to the envelope 13. The cover 24 serves as rear reserve bearing for the shaft 11, by means of rollers 26, a clearance being provided between the internal surface of the rollers 26 and the outer surface of the shaft 11. The rollers 26 are axially held against an internal abutment shoulder of the cover 24 by means of a ring 27 screwed into the cover 24.

To the rear of the shaft 11, at its free end portion, there is mounted the annular armature 28b of an axial magnetic bearing 28. The armature 28b is maintained axially against a ring 29, abutting on a shoulder of the shaft 11, and a ring 30, blocked by a nut 31. The rings 29 and 30 are made of insulating plastics material, the ring 30 having a radial surface 30a normally separated from the rollers 26 and being able to constitute a plastic self-lubricating track for the rear reserve rollers 26 in case of non-functioning of the axial bearing 28. The armature 28a of the axial bearing 28 comprises two annular ferromagnetic bodies 28c and 28d provided with coils 28e. The ferromagnetic bodies 28c and 28d are located on either side of the annular armature 28b, at a short distance from the peripheral parts of the radial faces of this armature. The ferromagnetic body 28c is housed in a groove provided in the cover 24, and the ferromagnetic body 28d is mounted in the envelope 13 and is axially held on one side by the armature 23a of the radial bearing 23, with interposition of an insulating ring 32, and on the other side by a ring 33 screwed in the envelope 13, with interposition of an insulating ring 34.

In the median portion of the envelope 13, between the armatures 16a and 23a of the radial bearings 16 and 23, there is mounted a tubular piece 35. The armature 36a of an electromagnetic radial detector 36 associated with the radial bearing 16, the inductor 37a of an electric motor 37 and the armature 38a of an electromagnetic radial detector associated with the radial bearing 23 are successively mounted, from front to rear, on the inner cylindrical surface 35a of the piece 35. These three elements are held radially between an inner abutment shoulder 35b of the piece 35 and a nut 39 screwed in the piece 35.

On the median portion of the shaft 11 between the annular armatures 16b and 23b of the radial bearings 16 and 23, are successively mounted a ring 36b, forming the annular armature of the radial detector 36, the armature 37b of the motor 37 and a ring 38b forming the annular armature of the radial detector 38. The assembly constituted by the armatures 16b and 23b, the rings 36b and 38b and the armature 37b, is held axially by means of two nuts 40 and 41 screwed to the shaft 11.

At the front of the shaft 11 there is mounted the annular armature 42b of an electromagnetic axial detector 42 of which the armature 42a is housed in an annular groove provided in the ring 21. The annular armature 42b is maintained axially between a shoulder of the shaft 11 and a nut 43 screwed on the shaft 11.

At the rear end of the shaft 11 there is disposed a second electromagnetic axial detector 53 composed of an armature 53a formed by a coil housed in the cover 24 and by a coil 53b facing the coil 53a and housed in a recess made in the rear radial face of the shaft 11. The coil 53b and the shaft 11 are coaxial.

The electromagnetic suspension of the spindle 10 in rotation is effected by means of the radial electromagnetic bearings 16 and 23 and the axial electromagnetic bearing 28. The radial electromagnetic detectors 36 and 38 have the same constitution, such as the one illustrated more particularly in FIG. 3. The armature 36a presents polar branches 36d about which coils 36e are coiled. For the radial detectors 36 and 38, an embodiment may advantageously be adopted which is similar to the one described in British Pat. No. 1,418,261 entitled: "RADIAL DISPLACEMENT DETECTION DEVICE FOR A MAGNETIC BEARING". The currents energizing the coils 16e and 23e of the radial bearings 16 and 23 are controlled from the signals delivered by the detectors 36 and 38. To this end, the control of the bearings 16 and 23 from the detectors 36 and 38, respectively, may be effected with the aid of the circuits described in U.S. Pat. No. 3,787,100.

The axial position of the spindle is adjusted by the axial detectors 42 and 53, the signals transmitted by the armatures 42a and 53a of these detectors adjusting the energizing current of the coils 28e of the axial bearing 28. It will be noted that the axial control of the spindle may be effected by using only one axial detector, preferably located at the front end of the shaft 11, to be affected as little as possible by the expansions of thermal origin of the shaft 11. However, the use of the two detectors 42 and 53 has proved advantageous, the detector 42 taking into account the slow variation in position of the shaft 11 and the detector 53 taking into account the variations in position, or oscillations, of the shaft 11 of high frequency.

The spindle 11 is rotated by the electric motor 37. This motor is an asynchronous motor of which the inductor 37a, comprising an iron core and energizing coils is fixed and of which the armature 37b is constituted by copper bars 37c, extending parallel to the axis of the shaft 11 and housed on the periphery of said latter. The bars 37c are electrically connected together by welding of their end parts. The inductor 37a of the motor 37, like the polar pieces of the armatures of the radial bearings 16 and 23 and the radial detectors 36 and 28, as well as the armatures of the radial bearings 16 and 23 are constituted by bundles of sheet metal or laminated iron. The cooling of the inductor 37a of the motor 37 is effected by circulation of a cooling fluid, for example, water, in a helical groove 44 provided in the outer cylindrical surface of the piece 35. This outer surface being closely applied against the internal surface of the envelope 13, the groove 44 forms a sealed circuit. This helical groove communicates with the outside through a feed orifice 45 and a discharge orifice 46 for the cooling fluid, these orifices being made in the wall of the envelope 13. As may be seen more particularly in FIG.

3, the orifices 45 and 46 open out substantially tangentially into the groove 44.

The electric conductors and cables connected to the coils 16e, 23e, 28e, 36e, 38e, 42e, and 53e, as well as the electric feed cables of the inductor 37e of the motor 37 terminate in a connection box 47 fixed to the cover 24. For the passage of these conductors and cables, passages such as 48 are made in the envelope 13, the piece 35 and the covers 18 and 24. The circuits (not shown) for controlling the electromagnetic bearings are disposed on the outside of the envelope 13 in order not to be subjected to the temperature conditions prevailing inside this envelope.

To avoid infiltration of dust and metal debris resulting from the machining operations outside the envelope 13, there are provided on the one hand a protective cover 49 fixed to the front of the envelope 13 by means of screws 50 screwed in the cover 18 and, on the other hand at least one orifice 51 made in the cover 18 and connected to a source of pressurized air (not shown), for the blowing of compressed air inside the envelope 13. This latter being hermetically closed in its rear part, the pressurized air introduced in the envelope escapes at the front of said latter and prevents penetration of dust or debris.

As has already been mentioned, the mode of suspension and driving of the spindle in the assembly according to the invention enables very high speeds of rotation to be attained, for example, of the order of 60,000 rpm; without imposing limitation on the diameter of the shaft of the spindle. This shaft may, therefore, have a high inertia and considerable rigidity. Moreover, the control by detectors of the position of the shaft of the spindle enables any displacement of the axis of the spindle with respect to its normal position to be corrected, which, allied with the rigidity of the shaft, enables a high machining precision to be attained.

During a machining operation, the radial and axial positions of the spindle may be controlled from the signals transmitted by the radial and axial detectors, so that these positions are fixed with respect to the envelope 13, the shaft 11 being maintained perfectly centered in the radial bearings 16 and 23 and the air-gap between the armature 28a and the armature 28b of the axial bearing 28 being maintained constant. In this case, the positioning and displacement of the tool is solely effected by displacing a carriage (not shown) on which the envelope 13 is fixed by means of bushings 52.

However, the tool-holding spindle assembly, such as described hereinbefore, offers a very advantageous supplementary possibility of controlling the positioning and displacement of the tool for a machining operation.

In fact, when the shaft 11 is maintained in an axial and radial reference position, for which for example it is perfectly centered in the envelope 13, there is, in all directions, a clearance of the order of 0.10 to 0.20 mm between the shaft 11 and the fixed parts. As soon as the axial or radial position of the shaft deviates, from this reference position, this displacement is detected by the axial or radial detectors and the energizing currents of axial and radial bearings are modified as a function of the signals transmitted by the detectors to return the shaft 11 into its reference position. It is consequently conceived that by modifying, in predetermined manner, the signals transmitted by the axial and/or radial detectors, or the energizing currents of the axial and/or radial bearings, the axial or radial reference position of the shaft 11 may be intentionally modified to impose thereon a displacement by a predetermined amplitude and direction.

Of course, the displacements of the tool which may thus be controlled electrically are of a limited maximum amplitude, of the order of 0.10 mm, but are of a precision clearly superior to that which could be attained by a mechanically controlled displacement, this proving to be extremely advantageous for the control of particular functions to be carried out.

The following list gives a few examples of specific functions which may thus be effected:

1. Control of the radial displacement of the spindle.

By acting on the signals transmitted by the radial detectors, the radial reference position of the axis of the spindle is changed by imposing a radial displacement of predetermined amplitude by simultaneous action on the front and rear bearings 16 and 23, respectively. By this control, the grinding of a workpiece may be terminated very precisely by imposing on the tool radial displacements of the order of a micron.

2. Control of the axial displacement of the spindle.

The axial reference position of the spindle may be modified by acting on the signals transmitted by the axial detectors. This modification may be effected in linear manner and, when it is effected simultaneously with a radial movement of the spindle, allows the rectification of inclined or curved surfaces such as surfaces of grooves or channels.

3. Correction of conicity.

By selectively modifying the radial reference position of the front radial bearing 16, or of the rear radial bearing 23, by action on the signals transmitted by the corresponding detector, the conicity of a workpiece may be compensated or corrected in the course of machining.

Such a selective modification of the radial reference positions of the radial bearings may also be effected for the purpose of adjusting the angular position of the shaft of the spindle.

4. Compensation of thermal effects.

The modification of the radial and axial reference positions of the spindle also makes it possible to compensate for deviations in position of the spindle which may result from expansion or contractions of thermal origin.

5. Action on the geometry of the ground surface.

When the ground surface must present a particular section, for example, when it is desired to ovalize this surface, a continuous displacement of the axial and/or radial reference position of the spindle may be electrically controlled, during machining, enabling the desired section to be directly obtained.

6. Micro-oscillations of the tool.

During a grinding operation, it is advantageous to give the tool a reciprocating linear movement superposed on its advance movement. Such a reciprocating linear movement may be obtained in the form of micro-oscillations, for example, by modulation of the energizing currents of the radial bearings or of the axial bearings.

The functions listed hereinabove by way of example all rest on a control of the displacement of the radial and/or axial reference position of the spindle. As has already been mentioned, this control may be effected by modification of the signals transmitted by one or more of the axial and radial detectors.

The radial detector 36 comprises the two pairs of coils X1-X'1, Y1-Y'1 and the radial detector 18 comprises the two pairs of coils X2-X'2, Y2-Y'2 (FIG. 4, 5).

Each radial bearing, for example 16, comprises a plurality of electromagnetic comprising the coils 16e (FIG. 2), these electromagnets being grouped in pairs, each pair comprising two diametrically opposite electromagnets. The radial bearing 16 comprises the two pairs of electromagnets A1-A'1, B1-B'1 and the radial bearing 23 comprises the two pairs of electromagnets A2-A'2, B2-B'2 (FIG. 4, 5). The control of radial position of the shaft 11 is effected by a control chain, (FIG. 4), e.g., such as the one described in U.S. Pat. No. 3,787,100 mentioned above, the signals of each pair of detector units D1, D'1, D2 and D'2 being algebraically added by means of adders A1 and A2 to supply a control signal of at least one of the feed circuits F1, F2 of a pair of electromagnets, respectively, E1, E'1, E2 and E'2. When the shaft 11 occupies a radial reference position for which it is perfectly centered in the bearing 16, the detector units of one pair furnish opposite signals which are equal in absolute value and the energizing current of the electromagnets of the armature of the bearing 16 are not modified. On the contrary, as soon as the shaft 11 deviates from the radial reference position, a control signal is issued to modify the energizing current of at least one pair of electromagnets in order to return the shaft 11 into its radial reference position.

When it is desired to control a displacement of predetermined amplitude and direction from the radial reference of the shaft 11, it is, therefore, sufficient to modify the signals transmitted by the detector units to give these signals the value that they would take if the shaft deviated from its reference position by the same distance but in the opposite direction. To this end, a control circuit C is provided, which is connected to the detector units of the detectors 36 and 38, which control circuit comprises means for selectively modifying the signals transmitted by the detector units and which is connected in output to the chain controlling the radial bearings 16 and 23.

The control of the displacement of the axial reference position of the spindle may be effected in similar manner by providing a control circuit C3 connected to the axial detectors 42 and 53, comprising means capable of selectively modifying the signals transmitted by these detectors, and connects in output to a chain F3 controlling the axial position of the spindle, said control chain controlling the energizing current supply circuits of the axial bearing 28.

FIG. 4 shows a whole servo loop which is, for example, of the type disclosed in U.S. Pat. No. 3,787,100 and differs therefrom merely by the provision of adders $Ax_1$, $Ax_2$, $Ay_1$, $Ay_2$ and $Az$ for eventually modifying the signals $x_1$, $x_2$, $y_1$, $y_2$ and $z$ each obtained by adding the signals delivered by the two detectors of a pair of detectors, respectively X1-X'1, X2-X'2, Y1-Y'1, Y2-Y'2 and 42-53.

The modifications of the signals $x_1$, $x_2$, $y_1$, $y_2$ and $z$ may be performed by adding thereto variable signals $\Delta x_1$, $\Delta x_2$, $\Delta y_1$, $\Delta y_2$ and $\Delta z$ delivered for example by adjustable potentiometers $Px_1$, $Px_2$, $Py_1$, $Py_2$ and $Pz$.

As indicated hereinbefore, the signals from the detectors are modified to give them the value that they would take if the desired position of the spindle were the reference position. The servo loop is thus continuously working so as to maintain the spindle in the desired new position.

The signals at the outputs of the adders $Ax_1$, $Ax_2$, $Ay_1$, $Ay_2$ and $Az$ are delivered to control circuit means C which may be identical to the one to which unmodified signals $x_1$, $x_2$, $y_1$, $y_2$ and $z$ are applied in the servo loop disclosed by the U.S. Pat. No. 3,787,100. The outputs of control circuit means C are connected to the energization coils of the electromagnets of the radial and axial bearings.

The values of $\Delta x_1$, $\Delta x_2$, $\Delta y_1$, $\Delta y_2$ and $\Delta z$ are selected in accordance with the specific function to be performed by modifying the signals delivered by the detectors.

It is clearly apparent that the modification of $x_1$ and $x_2$ by a same quantity ($\Delta x_1 = \Delta x_2$), and/or the modification of $y_1$ and $y_2$, also by a same quantity ($\Delta y_1 = \Delta y_2$) will result in a radial shift of the axial position of the spindle.

The modification of z by adding (or subtracting) thereto a quantity $\Delta z$ will result in an axial shift of the spindle.

If $x_1$ and $x_2$ are modified by different quantities ($\Delta x_1 \neq \Delta x_2$) and/or if $y_1$ and $y_2$ are also modified by different quantities ($\Delta y_1 \neq \Delta y_2$), the result will be a tilting of the axial position of the spindle.

Of course, a certain number of additions or modifications may be made to the above-mentioned embodiment, without departing from the scope of protection defined by the accompanying claims. Thus, detectors may be used other than electromagnetic ones, for example, optical or capacitive detectors. Furthermore, the application of the assembly according to the invention is not limited to grinding machines and may also be used for other machine-tools, more particularly for those in which the tool must be rotated at high speed.

We claim:

1. A tool-holding spindle assembly, particularly for a grinding machine, comprising:
   a power drive, for rotating the spindle,
   at least one electromagnetic radial bearing having excitation coils, an annular armature mounted on the shaft of the spindle and a fixed armature surrounding this annular armature,
   at least one electromagnetic axial bearing having a disc-shaped armature mounted on the shaft of the spindle and a fixed armature,
   at least one radial position detector comprising two pairs of detecting units disposed along two different radial directions for delivering signals representative of the radial position of the spindle,
   at least one axial position detector delivering a signal representative of the axial position of the spindle,
   a control chain for controlling the radial and axial position of the spindle, said control chain being connected to said radial and axial detectors for receiving said signals delivered thereby, and said control chain being connected to excitation coils of the armatures of each magnetic bearing, for controlling the position of the spindle in response to said signals,
   and means for selectively modifying at least one of the signals delivered by said detectors and thereby varying the reference position of the spindle for machining purposes, said signal modifying means being connected between said detectors and said control chain.

2. An assembly as claimed in claim 1, wherein said support means comprise two electromagnetic radial bearings disposed near the end zones of the spindle shaft, and wherein said power drive comprises an electrical motor having an armature mounted on the shaft of the spindle substantially at equidistance from the two radial bearings and a fixed inductor having the same axis as the armature and surrounding said armature.

3. An assembly as claimed in claim 2, wherein the armature of the electric motor is constituted by copper bars fixed to the periphery of the spindle shaft, extending parallel to the axis of this shaft and electrically connected together.

4. An assembly as claimed in claim 1, wherein said electromagnetic axial bearing is disposed on the free end portion of the spindle shaft.

5. An assembly as claimed in claim 4, comprising two axial detectors disposed at the two ends of the spindle shaft.

6. An assembly as claimed in claim 2, wherein each radial detector is an electromagnetic detector having a fixed armature and an annular armature mounted on the shaft of the spindle.

7. An assembly as claimed in claim 2, further comprising a fixed envelope, surrounding said shaft and on which are fixed the armature of said electromagnetic bearings and the inductor of the electric motor.

8. An assembly as claimed in claim 7, wherein said envelope is provided with a circuit for cooling fluid.

9. An assembly as claimed in claim 7, wherein said envelope is closed at its rear part surrounding the free end of the shaft of the spindle, and means are provided for the introduction of pressurized air inside the envelope.

10. An assembly as claimed in claim 1, comprising a control circuit which is connected to said radial position detector and of which the output is connected to said control chain, this control circuit comprising means for selectively modifying the signals coming from said radial position detector and which are transmitted to the control chain so as to modify the radial reference position of the spindle in predetermined manner.

11. An assembly as claimed in claim 1, comprising a control circuit which is connected to said at least one axial position detector and of which the output is connected to said control chain, this second control circuit comprising means for selectively modifying the signals coming from said at least one axial position detector and which are transmitted to the control chain so as to modify the axial reference position of the spindle in predetermined manner.

* * * * *